US006510995B2

(12) United States Patent
(10) Patent No.: US 6,510,995 B2
(45) Date of Patent: Jan. 28, 2003

Muthu et al.

(54) RGB LED BASED LIGHT DRIVER USING MICROPROCESSOR CONTROLLED AC DISTRIBUTED POWER SYSTEM

(75) Inventors: Subramanian Muthu, Ossining, NY (US); Chin Chang, Yorktown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/810,142

(22) Filed: Mar. 16, 2001

(65) Prior Publication Data

US 2002/0145041 A1 Oct. 10, 2002

(51) Int. Cl.[7] .................................................. G06K 7/14

(52) U.S. Cl. ................................... 235/454; 235/462.25

(58) Field of Search ............................ 235/462.25, 454, 235/455, 462.01–462.49, 472.01, 472.03; 358/509, 505, 475, 506, 501, 487

(56) References Cited

U.S. PATENT DOCUMENTS

| | | | | | |
|---|---|---|---|---|---|
| 4,859,832 | A | * | 8/1989 | Uehara et al. | 219/411 |
| 5,508,825 | A | * | 4/1996 | Kataoka | 358/474 |
| 5,808,286 | A | * | 9/1998 | Nukui et al. | 235/472 |
| 6,084,692 | A | * | 7/2000 | Ohtani et al. | 358/509 |

* cited by examiner

*Primary Examiner*—Thien M. Le

(57) ABSTRACT

A device for controlling and adjusting a display light for a retail display system comprising a computer associated with plural light sources for adjusting the light sources to optimally display particular products. The light sources are adjusted based upon a prestored table specifying optimal lighting conditions for each of plural products, and a feedback loop that feeds back actual lighting conditions.

16 Claims, 4 Drawing Sheets

RGB LED BASED LIGHT DRIVER USING MICROPROCESSOR CONTROLLED AC DISTRIBUTED POWER SYSTEM

TECHNICAL FIELD

This invention relates to commercial display systems and the like, and more particularly, to an improved method and apparatus for lighting such commercial display systems and the like. The invention has particular applications in commercial refrigeration systems used in a retail environment, such as retail display freezers.

BACKGROUND OF THE INVENTION

Red-Green-Blue (RGB) based white Light Emitting Diode ("LED") illumination is known in the art and is finding applications in backlighting for LCD panels, lighting for commercial freezers, signage etc. For these applications, linear power supplies or switch-mode power supplies are used to drive the LEDs. The efficiency of the overall system with the use of linear power supply is low and the switch-mode power supply overcomes this problem. Since there are three LED light sources, three independent power supplies are used to drive the LEDs with a proper current control scheme. In this configuration, each power supply may contain independent AC/DC converter, a power factor correction unit, an isolation transformer, and a DC/AC converter system. There exists a redundancy in this scheme due to the three independent AC/DC converters, power factor correction unit, and the isolation transformer. In addition, it requires independent control of the converters in the power supplies. This scheme results in increase in cost, complexity in control and poor performance.

A still further problem with the present state of the art is accurately controlling the amount of each type of light emitted. More specifically, the color of the light resulting from the combination of the light emitted by the red, green, and blue lights is determined largely by the relative amounts of each type of light that gets mixed together. The light source associated with each type of light has a different sensitivity to age and temperature, as well as other factors. As a result, maintaining the appropriate amount of each color of light such that the resultant total light amount is correct is a difficult if not impossible task.

Another issue not addressed by prior systems is the fact that in a display case or retail display refrigeration device, the type and amount of light used to display particular products may influence a consumer's purchasing decisions. There exists no technique of uniformly assuring that each specific product is displayed using the optimum lighting conditions.

SUMMARY OF THE INVENTION

The above and other problem of the prior art are overcome in accordance with the present invention which relates to an LED current driver for a lighting system applicable in commercial displays. In accordance with the invention, drivers are utilized to drive red, green, and blue LEDs in a specified proportion with one another. A feedback loop transmits color and intensity information to a microprocessor, which adjusts the values of each of the red, green, and blue lights to achieve a prescribed lighting intensity and color.

In an enhanced embodiment, a computer and storage are provided for determining the intensity and color of light used based upon specific products being displayed, or specific times of day. Specifically, a computer may adjust the light color and/or intensity to optimize display at particular times or for particular products. In one exemplary embodiment, a microprocessor controlled AC distributed power supply system is used to provide LED drive currents to a white LED luminary for lighting commercial freezers. The AC distributed system contains a front-end AC/DC converter with power factor correction, a high frequency inverter, an isolation transformer and three DC/AC converters with RGB drive current control system. A single, front-end AC/DC converter system converts the AC supply and maintains a constant DC link voltage as the input to the high frequency DC/AC inverter. The AC/DC converter also performs the power factor correction at the AC mains. The high frequency converter converts the DC voltage to AC and supplies powers to three AC/DC converters with LED drive current control.

The power converter system is controlled by a microprocessor system. The microprocessor system provides an integrated closed loop control and the PWM generation for the converter systems, in addition to the control of the white light generated by the LED luminary. This approach provides an integral solution for the control of the LED driver system. The control algorithm for the microprocessor system is developed for modularity and with multi-processing features, to provide the effective controlling capabilities for the microprocessor system.

The microprocessor system is also optionally connected to a user computer, which is programmed with the food that will be displayed in the freezers. The computer in the shop selects the suitable white color point and the lighting level that should be generated by the system when a specified food is being displayed in the freezers, based upon programmed user priorities. The computer supplies this information to the microprocessor system at the appropriate times, which controls the driver system to produce the required color and lighting level. Therefore, the selection of the color and lighting level for the displayed food is automated. The computer can also start and stop the freezer driver such that the freezer lights are switched off automatically when it is not needed, and therefore, the power saving is achieved.

In another enhanced embodiment, the system is arranged to accept data from an input device, such as a hand held keyboard or bar code scanner.

DETAILED DESCRIPTION OF THE PREFFERED EMBODIMENT

Figure 1:
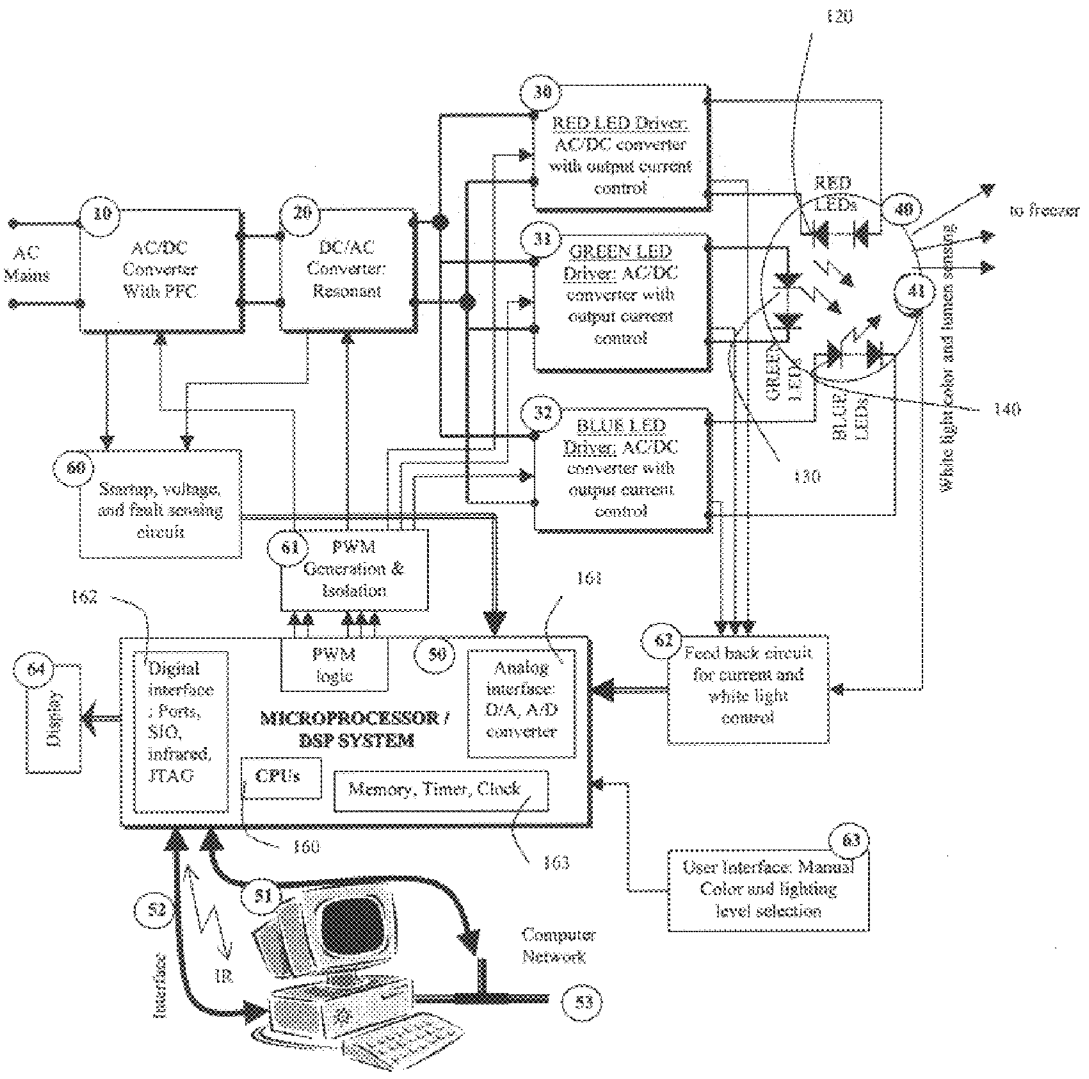
FIG. 1 represents a block diagram overview of the exemplary embodiment of the present invention.

FIG. 1 presents the overview of the microprocessor controlled AC power supply system for RGB LED based freezer driver in accordance with an exemplary embodiment of the invention. The power is supplied by front-end AC/DC converter 10, high frequency DC/AC converter 20, and three load-end AC/DC converters 30, 31 and 32 for providing RGB LED drive currents. The system includes Red, Green and Blue LED light sources 120, 130 and 140 respectively. Each Red, Green and Blue LED light source is made of a plurality of LEDs connected in a suitable series and/or parallel configuration.

The light source also houses light sensors such as photodiodes and heat-sink temperature sensors (not shown) for closed-loop feedback control of the white light. The light output of the light source may be supplied to mixing optics and an optical fiber system (not shown) for transmission of the light into the freezer or similar environment. However, any suitable means of conveying the light is acceptable.

The system is controlled by a Microprocessor system 50. The Microprocessor system uses feedback system 62 to convey variables to the Microprocessor 50. Control signals are provided to PWM generation and isolation 61 as shown for use in controlling DC/AC converter 20. By adjusting the amplitude and/or duty cycle of the PWM signal produced, the power to each driver 30–32 is adjusted.

The microprocessor system is connected to a user interface and a messaging display system 64. The microprocessor system is also interfaced to an optional computer 51, or to the computer network 53 either via infrared communications or though series/parallel ports 52.

The primary function of the front-end AC/DC converter 10 is to convert the AC supply voltage to a DC voltage. In addition, the AC/DC converter 10 is made to perform the power factor correction at the AC mains, possibly with universal voltage range input. The front-end AC/DC converter 10 can be based on Flyback or Boost topologies.

The feedback control system for the output voltage and the power factor correction at the AC mains is carried out by the microprocessor 50 which outputs the necessary control signals via the PWM generation and the isolation block 61. The PWM gating signals are also generated by the microprocessor 50. For this, the line current is also one of the feedback variables in addition to the DC link voltage. This is shown at 62.

The microprocessor 50 then directly provides the PWM gating signals to the AC/DC converter 10. Alternatively, the power factor correction and the PWM function can be carried out externally. In this case, the AC/DC converter contains the necessary function blocks for the PFC and the PWM generation.

Figure 2:
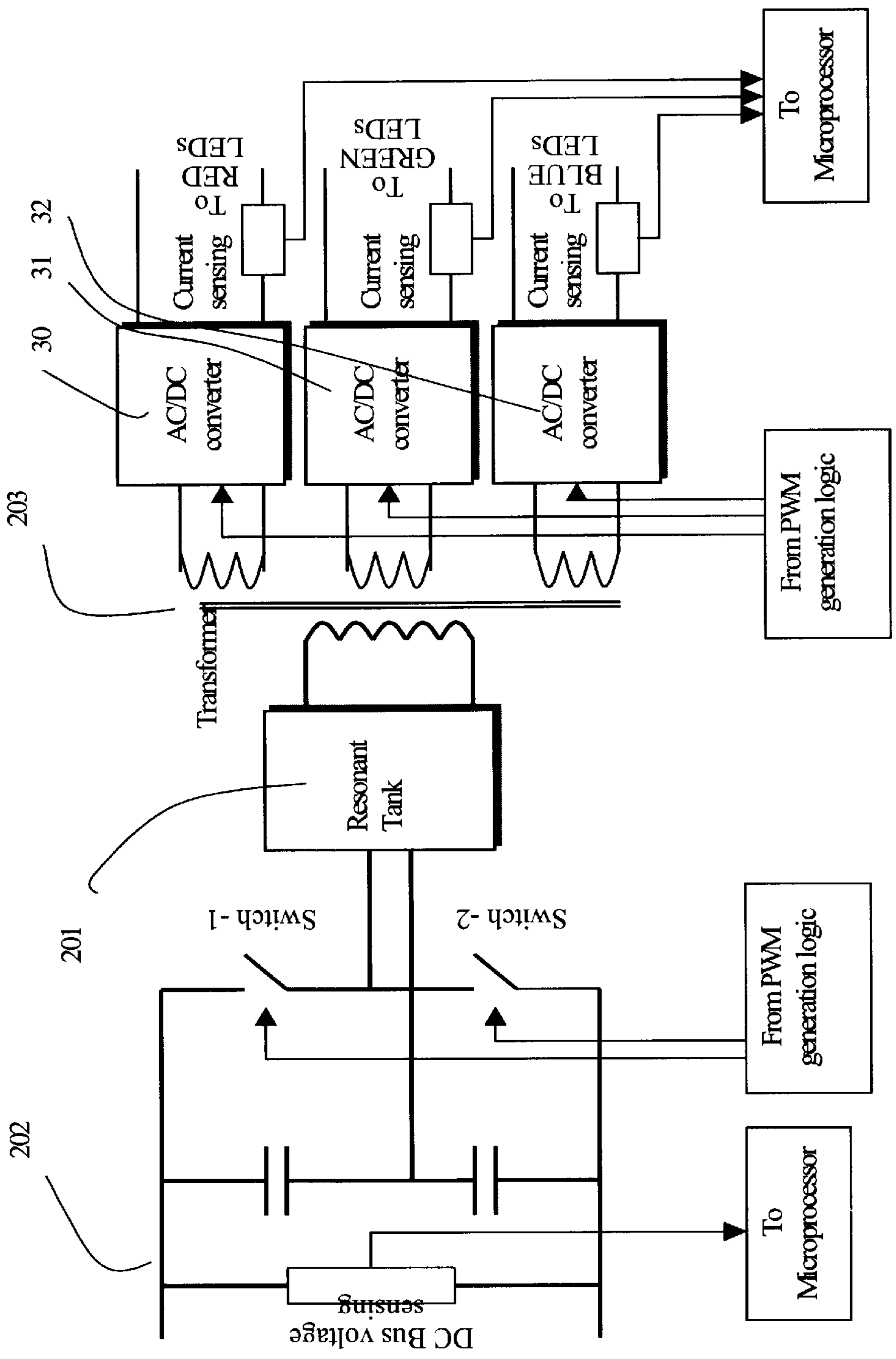
FIG. 2 depicts a representation of a distributed power supply for use in connection with the present invention.

The output of the AC/DC converter system is connected to the input section of the high frequency DC/AC inverter system 20. The DC/AC converter system converts the DC voltage to a high frequency AC voltage. The DC/AC converter is realized either by resonant converter or a square wave converter topology. As an example, the DC/AC converter system based on a resonant converter topology is shown in FIG. 2. In FIG. 2, the resonant converter system is based on the half bridge converter system 202 connected to a resonant tank 201. Alternatively, a full bridge configuration can also be used. The output of the converter is fed to a suitable resonant tank, whose output is connected to a high frequency isolation transformer 203. The transformers then drive converters 30–32 as shown.

Figure 3:
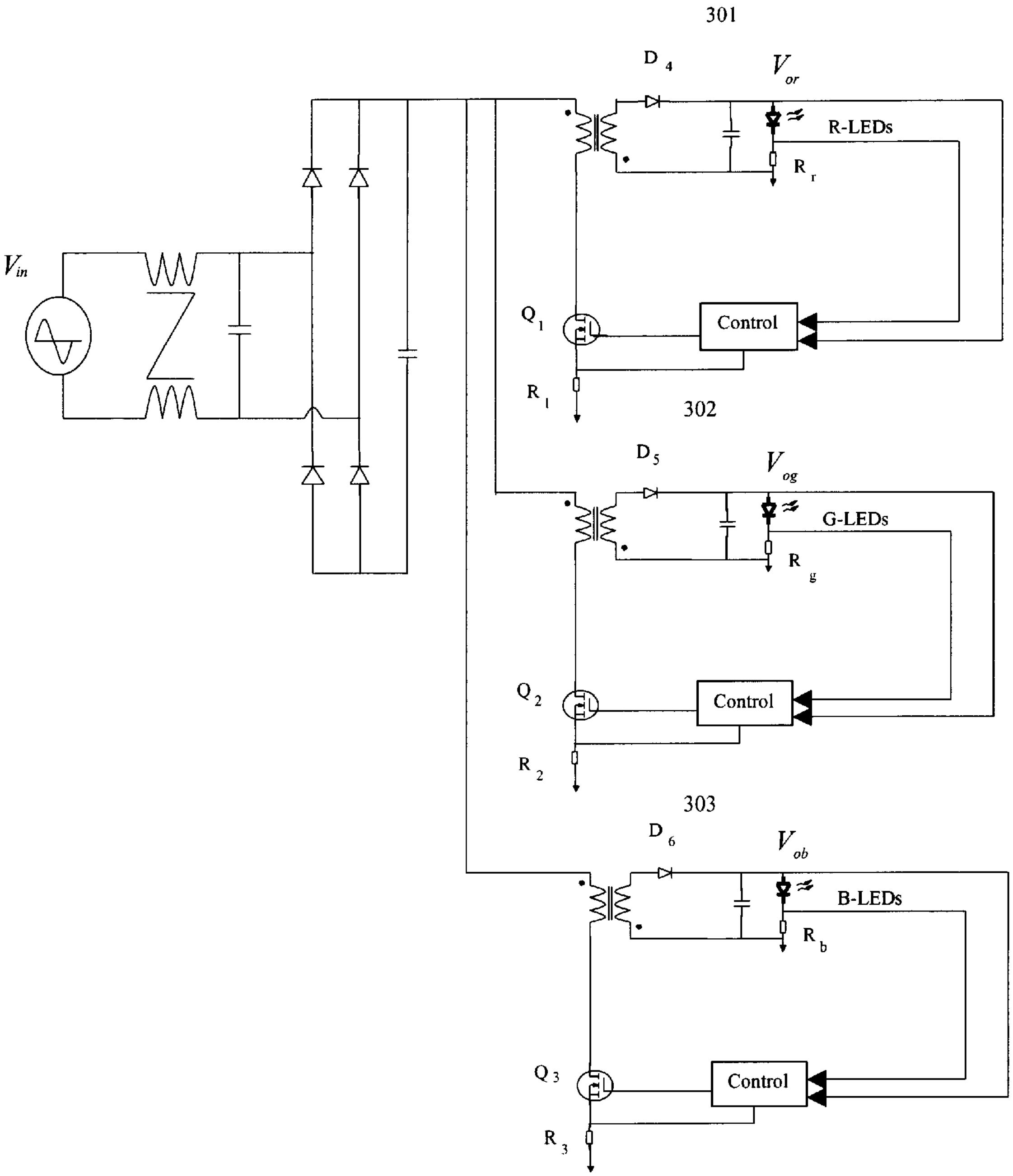
FIG. 3 shows a second embodiment of a distributed power system for use in driving the lights in accordance with an exemplary embodiment of the present invention.

Certain simplifications are possible for particular applications. For example, when the light output level is not high, some single stage circuits could be utilized. FIG. 3 shows an additional embodiment of the power supply system of FIG. 2. The arrangement of FIG. 3 includes three Flyback converters operated with unity power factor correction, connected in parallel. In this case, the AC distributed system is realized at the line frequency of the input voltage. Such system is also controlled by microprocessor 50.

Returning to FIG. 1, the outputs of the AC/DC converters 30–32 are connected to the RGB LED light sources, and provide regulated drive currents to the LED light sources 120, 130 and 140. The RGB LED light sources may be supplied either with the constant DC current or by PWM current pulse. The magnitude of the DC current or the duty ratio of the PWM current pulses is determined by a white light control system in order to control the color and the lighting level of the white light in accordance with known techniques. The control system is also executed by the microprocessor.

A suitable light sensor 40 and a heat sink temperature sensor 41, as shown in FIG. 1, are used to sense the light output and the heat sink temperature of the LEDs. These parameters are fed into the microprocessor 50, through feedback circuit 62. The microprocessor 50 calculates the color and the lighting level of the white luminary. Then, the microprocessor 50 obtains the required LED drive currents or the PWM gating pulse widths. The AC/DC converter is then controlled to provide the required LED drive currents.

For inputting the feedback signals into the microprocessor system, the feed back circuit 62, is used. The feed back circuit 62 includes sensing and conditioning circuits for inputting the feed back signals directly to the analog-to-digital converter 161 in the microprocessor system 50. The feed back variables may comprise the LED light source output from LEDs 120, 130 and 140, heat sink temperature from sensor 41, LED drive currents, DC link voltages, and/or line currents.

The feed back circuit also contains fault-sensing circuits, which generate interrupts upon a fault. The outputs of the fault sensing circuits are directly connected to non-maskable interrupts in the microprocessor system.

The microprocessor 50 directly provides the PWM gating signals, which are first passed through an isolation circuit 61. The outputs of this isolation circuit are fed into individual MOSFET drivers in AC/DC converter 10, DC/AC converter 20, and LED drivers 30,31, and 32.

Figure 4:
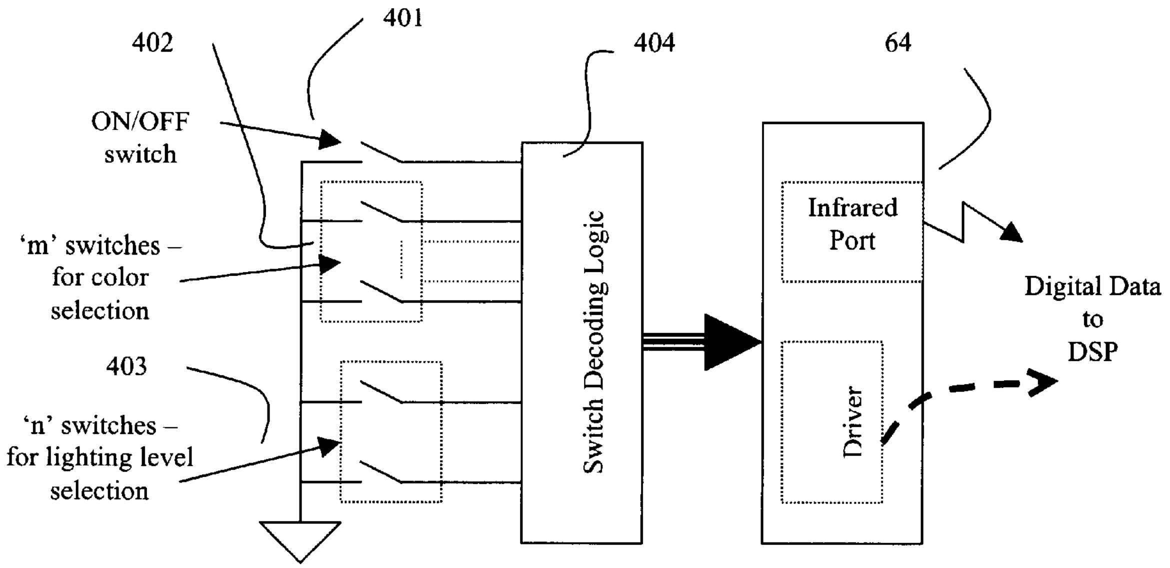
FIG. 4 shows the user interface for selecting a particular color for the lighting system.

The microprocessor 50 is also connected to a user interface system 63, for manually selecting the color and the lighting level for the white light. An exemplary embodiment of the user interface system 63 is shown in FIG. 4, which comprises switches 401–403 and switch decoding logic 404. When a switch is closed, the decoding logic 404 detects the switch closure and outputs the data in digital form. The output of the decoding logic can be interfaced to the microprocessor 50 using either infrared communications or via cables or other means. The user interface 64 also contains on ON/OFF switch 401 for starting and stopping the system, and switches 402 and 403 for selecting color and light level.

The microprocessor 50 is also connected to a message display system 64, which is used to display the status of the microprocessor system such as the selected color, system condition, and the lighting levels.

The microprocessor 50 may include at least one CPU or a DSP 160, analog interface devices 161 such as analog-to-digital converter and digital-to-analog converter system, digital interfaces 162 such as serial input/output, infrared port, JTAG interface, digital ports, and other devices 163 such as memory, timers and a clock. A multi-processor system with more than one microprocessor can be used if all the control functions and the PWM generation are implemented in the microprocessor system.

The output of the feed back circuit 62 for sensing light, LED drive currents, and the DC link voltage are input to the analog-to-digital converters 161, which converts the analog signals to digital for the use by the control algorithms.

The microprocessor system is also connected to a computer 51, which contains the information about the food, and the time and the date of the food that will be displayed in the freezer. The computer is also programmed to select a proper white color point and the lighting level based on the food that will be displayed. The microprocessor system can be interfaced to this computer either via an infrared port, or through a serial port or parallel port or a JTAG connector. The microprocessor system is properly equipped with a suitable interfacing system to handle such connectivity. The computer then supplies the information for the color and the lighting level of the white light depending on the food that is being displayed. Therefore, the selection of the color and dimming level for the white light is automated and the appropriate white light is automatically generated based on the food.

The computer also contains the information about the operational hours for the shop. Therefore, it can start the LED freezer light source when the shop is opened and shut down the driver when the shop is closed. This arrangement results in automatic power savings.

Alternatively, rather than use time, the computer may either locally store or access a database of all products. When the user puts product into a freezer, he/she scans it into the computer using an optional bar code reader, hand held keyboard, or other similar device. The computer then sets the light levels and colors in accordance with the stored information for that product by performing a table look up.

While the above describes the preferred embodiment of the invention, various other modifications and additions will be apparent to those of skill in the art. These modifications are intended to fall within the scope of the following claims.

What is claimed is:

1. An apparatus for controlling multiple light sources to be mixed to form light of a predetermined color, said apparatus comprising:

plural color sensors, for detecting an amount of light emitted from each light source;

storage means, for storing predetermined values indicative of a desired amount of light to be emitted from each light source; and a processor, for comparing the amount of light detected from each light sources with a desired amount of light to be emitted from each light source and for adjusting a Pulse Width Modulated (PWM) signal inputted to a power source supplying the lights sources in response thereto.

2. The apparatus of claim 1, wherein a duty cycle of the PWM signal is adjusted.

3. The apparatus of claim 1, wherein the PWM signal is adjusted to control both the predetermined color and an intensity of light emitted at the predetermined color.

4. An apparatus for controlling multiple light sources to be mixed to form light of a predetermined color, said apparatus comprising:

plural color sensors, for detecting an amount of light emitted from each light source;

storage means, for storing predetermined values indicative of a desired amount of light to be emitted from each light source; and a processor, for comparing the amount of light detected from each light sources with a desired amount of light to be emitted from each light source and for adjusting a Pulse Width Modulated (PWM) signal inputted to a power source supplying the lights sources in response thereto, wherein said processor is connected to a separate computer, the computer including data and software for controlling the amount of light emitted from each light source based upon measured conditions and predetermined inputs.

5. The apparatus of claim 4, wherein the measured conditions are obtained by inputting a product to be displayed with the light of the predetermined color, and the predetermined inputs are stored values indicating the predetermined color.

6. The apparatus of claim 4, wherein the measured conditions includes time.

7. A computer apparatus for adjusting at least one of a color and an intensity of light emitted to display products for sale, said computer apparatus comprising:

a table of stored values indicative of desired relative values of each of plural light sources for each type of product to be displayed;

an external interface for accepting from an input device information indicative of a product to be displayed with the light; and control logic for performing a table lookup and adjusting a Pulse Width Modulated signal to cause said light sources to emit said stored desired values.

8. The computer apparatus of claim 7, wherein the input device is a bar code scanner.

9. The computer apparatus of claim 7, wherein the input device is permanently connected to a refrigeration apparatus.

10. A method of adjusting light used in a commercial refrigeration device to display particular products, said method comprising:

storing a table indicative of a color and an intensity of light desired to be utilized for display of each of a plurality of products;

accepting information indicative of a product to be displayed;

performing a table lookup to adjust the color and the intensity of the light in a manner such that the product is displayed with the light desired; and adjusting at least one of an amplitude or a duty cycle of a Pulse Width Modulated (PWM) signal in a manner such that the color and the intensity of the light is properly adjusted.

11. The method of claim 10, further comprising:

utilizing a DC/AC converter to adjust the output current of each of a plural of Light Emitting Diode (LED) drivers to thereby separately adjusting current delivered to each of LED drivers.

12. The method of claim 10, wherein said accepting of information is implemented by accepting the information from a keyboard attached permanently to the refrigeration device.

13. A display device for a product to be sold in a retail environment or the like, said display device comprising:

a shelf for holing the product;

a lighting device attached to the shelf; and storage and input means for storing values indicative of a color and an intensity of a light to be used to display the product and for adjusting a Pulse Width Modulated (PWM) signal to alter the color and the intensity of the light being displayed in response to an input of information specifying the product being displayed.

14. The display device of claim 13, wherein said shelf is included within a refrigeration device.

15. A device for controlling a light, said device comprising:

a stored table of products and desired lighting conditions for each product;

means for inputting a specific product;

means for adjusting the light to optimally display the product; and a pulse width modulation circuit for adjusting power delivered to each of a plural of light emitting diodes in response to the information stored in the table and information fed back from light sensors.

16. The device of claim 15, wherein said means for inputting a specific products is a bar code scanner.

* * * * *